United States Patent
Altenburger et al.

(10) Patent No.: US 11,026,311 B2
(45) Date of Patent: Jun. 1, 2021

(54) EMERGENCY LIGHTING SYSTEM WITH POWER ROLLBACK

(71) Applicant: ABL IP Holding LLC, Atlanta, GA (US)

(72) Inventors: Ray Altenburger, Oxford, GA (US); Dean W. Mavis, McDonough, GA (US); Gunjan P. Patel, Alpharetta, GA (US)

(73) Assignee: ABL IP Holding LLC, Atlanta, GA (US)

( * ) Notice: Subject to any disclaimer, the term of this patent is extended or adjusted under 35 U.S.C. 154(b) by 280 days.

(21) Appl. No.: 16/009,783

(22) Filed: Jun. 15, 2018

(65) Prior Publication Data
US 2018/0368222 A1  Dec. 20, 2018

Related U.S. Application Data

(60) Provisional application No. 62/521,588, filed on Jun. 19, 2017.

(51) Int. Cl.
*H05B 45/50* (2020.01)
*H02J 7/00* (2006.01)
(Continued)

(52) U.S. Cl.
CPC ............. *H05B 45/50* (2020.01); *F21V 23/02* (2013.01); *H02J 7/0021* (2013.01);
(Continued)

(58) Field of Classification Search
CPC ...... H02J 9/06; H02J 7/00; H02J 9/065; H02J 7/0072; H05B 45/50; H05B 45/00; H05B 47/00
(Continued)

(56) References Cited

U.S. PATENT DOCUMENTS 3,660,714 A  5/1972  Chandler
4,010,381 A  3/1977  Fickenscher et al.
(Continued)

FOREIGN PATENT DOCUMENTS

| CN | 101742783 | 6/2010 |
| CN | 201599702 | 10/2010 |
| EP | 1953894 | 8/2008 |

OTHER PUBLICATIONS

U.S. Appl. No. 16/009,794, "Notice of Allowance", dated Apr. 29, 2020, 10 pages.
(Continued)

*Primary Examiner* — Rexford N Barnie
*Assistant Examiner* — Swarna N Chowdhuri
(74) *Attorney, Agent, or Firm* — Kilpatrick Townsend & Stockton LLP

(57) ABSTRACT

An emergency LED lighting system maintains power to an LED lighting source based on measured voltages and currents provided to the LED lighting source; rolls back or decreases power provided to an LED lighting source over time in order to increase the amount of time the battery can power the LED lighting source; executes a soft start procedure, such that the power provided to the LED lighting source is gradually ramped up during activation of the LED lighting sources; identifies a type of battery coupled to the emergency LED lighting system; cycles the emergency LED lighting system between charging mode and standby mode to reduce power consumption over a window of time; detects AC power or an absence of AC power; and/or uses a status LED to communicate information about the emergency LED lighting system with a remote device.

17 Claims, 17 Drawing Sheets

(51) Int. Cl.
*H02J 9/06* (2006.01)
*H05B 45/00* (2020.01)
*H05B 45/37* (2020.01)
*H05B 47/105* (2020.01)
*H02J 7/02* (2016.01)
*F21V 23/02* (2006.01)
*F21Y 115/10* (2016.01)
*F21S 9/02* (2006.01)

(52) U.S. Cl.
CPC .......... *H02J 7/0029* (2013.01); *H02J 7/0047* (2013.01); *H02J 7/0068* (2013.01); *H02J 7/027* (2013.01); *H02J 9/065* (2013.01); *H05B 45/00* (2020.01); *H05B 45/37* (2020.01); *H05B 47/105* (2020.01); *F21S 9/022* (2013.01); *F21Y 2115/10* (2016.08)

(58) Field of Classification Search
USPC .......................................................... 307/20
See application file for complete search history.

(56) References Cited

U.S. PATENT DOCUMENTS

| | | | |
|---|---|---|---|
| 4,799,039 A | 1/1989 | Balcom et al. | |
| 4,988,889 A | 1/1991 | Oughton, Jr. | |
| 6,583,571 B1 | 6/2003 | Wang | |
| 7,057,351 B2 | 6/2006 | Kuo | |
| 7,466,081 B2 | 12/2008 | Schweigert | |
| 8,716,936 B2 | 5/2014 | Rohner et al. | |
| 8,796,946 B2 | 8/2014 | Rohner et al. | |
| 9,107,269 B2 | 8/2015 | Martin et al. | |
| 9,167,674 B2 | 10/2015 | Mangiaracina | |
| 9,270,143 B1 | 2/2016 | Mangiaracina et al. | |
| 9,398,649 B2 | 7/2016 | Wang | |
| 9,491,815 B2 | 11/2016 | Jin | |
| 9,812,901 B2 | 11/2017 | Descarries et al. | |
| 2010/0301766 A1 | 12/2010 | Zudrell-Koch et al. | |
| 2011/0133655 A1* | 6/2011 | Recker | H02H 3/08 315/159 |
| 2012/0043889 A1 | 2/2012 | Recker et al. | |
| 2012/0104858 A1 | 5/2012 | Noe | |
| 2013/0200707 A1 | 8/2013 | Hartmann et al. | |
| 2013/0342342 A1* | 12/2013 | Sabre | G09F 13/18 340/509 |
| 2014/0240966 A1 | 8/2014 | Garcia et al. | |
| 2014/0292506 A1 | 10/2014 | Rapeanu et al. | |
| 2014/0346960 A1 | 11/2014 | Lenk | |
| 2015/0155743 A1 | 6/2015 | Noguchi | |
| 2015/0214785 A1 | 7/2015 | Jagjitpati et al. | |
| 2016/0117908 A1 | 4/2016 | Ongyanco et al. | |
| 2016/0330811 A1 | 11/2016 | Wang | |
| 2016/0356469 A1 | 12/2016 | Garcia et al. | |
| 2017/0051886 A1 | 2/2017 | Liu et al. | |
| 2017/0310160 A1* | 10/2017 | Wan | F21S 9/02 |
| 2018/0062425 A1 | 3/2018 | Frankland | |

OTHER PUBLICATIONS

U.S. Appl. No. 16/009,587, "Non-Final Office Action", dated Oct. 21, 2019, 17 pages.
U.S. Appl. No. 16/009,794, "Non-Final Office Action", dated Nov. 5, 2019, 18 pages.
U.S. Appl. No. 16/009,587, "Notice of Allowance", dated Dec. 11, 2019, 13 pages.
U.S. Appl. No. 16/009,794, "Final Office Action", dated Feb. 28, 2020, 18 pages.
CA3,008,730, "Office Action", dated Jan. 16, 2020, 7 pages.

* cited by examiner

EMERGENCY LIGHTING SYSTEM WITH POWER ROLLBACK

CROSS REFERENCE TO RELATED APPLICATIONS

This application claims priority to U.S. Prov. App. No. 62/521,588, titled "Powering an LED Emergency Lighting System" and filed on Jun. 19, 2017, which is incorporated herein in its entirety. This disclosure is also related to U.S. Application Ser. No. 16/009,794, concurrently filed herewith and U.S. Pat. App. Ser. No. 16/009,587 concurrently filed herewith, both of which are incorporated herein in their entirety.

TECHNICAL FIELD

The present disclosure relates generally to emergency lighting systems and more specifically, but not by way of limitation, this disclosure relates to providing approximately constant power to an emergency lighting system.

BACKGROUND

Emergency lighting includes lighting that is used for path of egress illumination upon the loss of normal AC power. Some emergency LED lighting systems include a battery charger, a battery, and a transfer switch to energize the light source upon the loss of normal power. Some emergency LED lighting systems can use additional circuitry to convert a voltage of the battery to a voltage level suitable for the associated light source since LED light sources or light engines are available in a wide range of voltage levels and current capabilities.

An emergency LED lighting system can implement a feed forward technique to maintain approximately constant power. In some aspects, the battery discharge current can be controlled to maintain input power to a DC/DC converter. The power to the LED source can be controlled since the DC/DC converter losses are relatively low and do not significantly impact the output power. Some emergency LED lighting systems include a circuit with a flyback DC/DC converter. The leakage inductance of a flyback transformer introduces energy losses, and additional circuitry (e.g., a snubber circuit) may be included to absorb the losses. In addition, the magnetic core of the transformer may be driven in a single direction, which can reduce the transformer utilization. The flyback design can also have higher peak currents than some other DC/DC converter types. It would be advantageous to provide a constant power emergency lighting system that does not require a flyback converter to avoid these losses, additional circuitry, and transformer under utilization.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Certain aspects and features relate to providing constant power to an emergency light emitting diode ("LED") lighting system. An emergency LED lighting system can power an LED lighting source using an AC power source (e.g., AC mains power) during normal operation and using an emergency power source (e.g., a battery) during an emergency mode. The emergency LED lighting system can include a battery charging circuit for charging a battery during a charging mode when the AC power source is available. In some aspects, an emergency LED lighting system can enter the emergency mode in response to the emergency LED lighting system being disconnected from the AC power source. The system may also provide a test mode, which may be used to test the emergency LED lighting system to ensure components are functioning properly even though AC power has not been lost.

Emergency LED lighting systems are disclosed herein that: (i) maintain approximately constant power to the LED lighting source for a variety of LED load voltages and throughout a battery discharge cycle; (ii) provide power rollback for conserving energy; (iii) provide a soft start for activating the LED lighting sources; (iv) identify the type of an associated battery; (v) provide a standby mode to reduce energy consumption; (vi) provide a low power AC detector circuit; or (vii) provide communication with remote devices. These features can improve the efficiency of the emergency LED lighting system and allow the emergency LED lighting system to provide steadier emergency lighting for longer periods of time.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
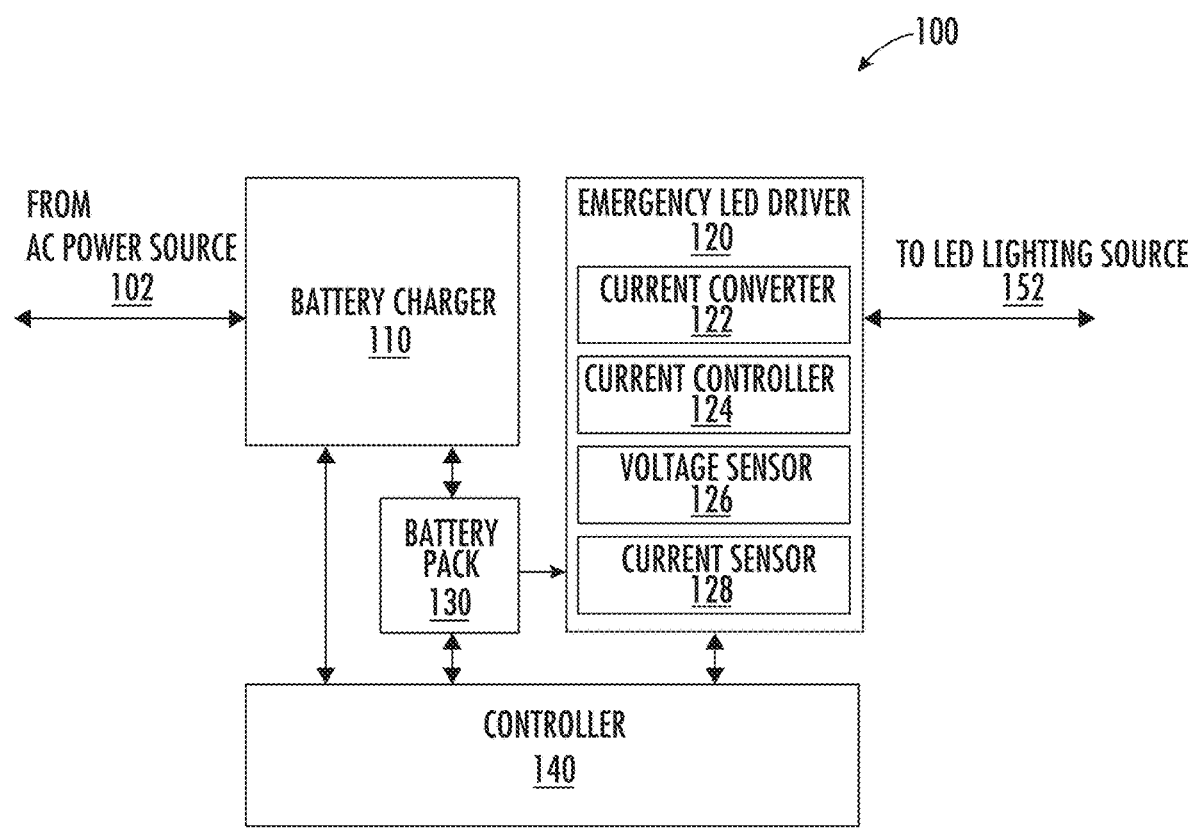
FIG. 1 is a block diagram of an example of an emergency LED lighting system according to one aspect of the present disclosure.

FIG. 1 depicts an example of an emergency LED lighting system 100. In this example, the emergency LED lighting system 100 includes a controller 140, a battery charger 110, a battery pack 130, and an emergency LED driver 120. During normal operation of the emergency LED lighting system 100 (e.g., charging mode), the battery charger 110 can be coupled by connection 102 to an AC power source (e.g., AC mains power). The battery charger 110 can receive an AC input from the AC power source and use the AC input to charge the battery pack 130. The battery charger 110 can also use the AC input to power the controller 140.

Although FIG. 1 depicts the battery charger receiving the AC input and distributing power amongst the other devices in the emergency LED lighting system 100, other implementations are possible. For example, other types of circuits may power the emergency LED Driver 120 and controller 140.

The emergency LED driver 120 can include a current converter 122, a current controller 124, a voltage sensor 126, and a current sensor 128. The emergency LED driver 120 can direct power from the AC power source to an LED lighting source, via connection 152, during normal operation. The voltage sensor 126 can include a resistor divider coupled in parallel to the LED lighting source for measuring a voltage across the LED lighting source. The current sensor 128 can include a resistor coupled in series to an output of the LED lighting source for measuring a current passing through the LED lighting source. During emergency mode, the current controller 124 and the current converter 122 provide current to the LED lighting source. The current controller 124 can adjust the current being provided to the LED lighting source based on instructions from the controller 140.

The controller 140 can be communicatively coupled to the battery charger 110, the emergency LED driver 120, and the battery pack 130. The controller 140 can communicate with the battery charger 110 to control when the battery charger 110 provides power to the battery pack 130. The controller 140 can query the battery pack 130 to determine the type of battery pack and to monitor status of the battery. The controller 140 can be coupled to the emergency LED driver 120 for instructing the current controller 124 to adjust the current being provided to the LED lighting source. For example, the controller 140 can receive the voltage from the voltage sensor 126 and the current from the current sensor 128, determine a power being provided to the LED lighting source based on the voltage and the current, and instruct the current controller 124 to adjust the current provided to the LED lighting source such that a predetermined power is provided to the LED lighting source.

Figure 2:
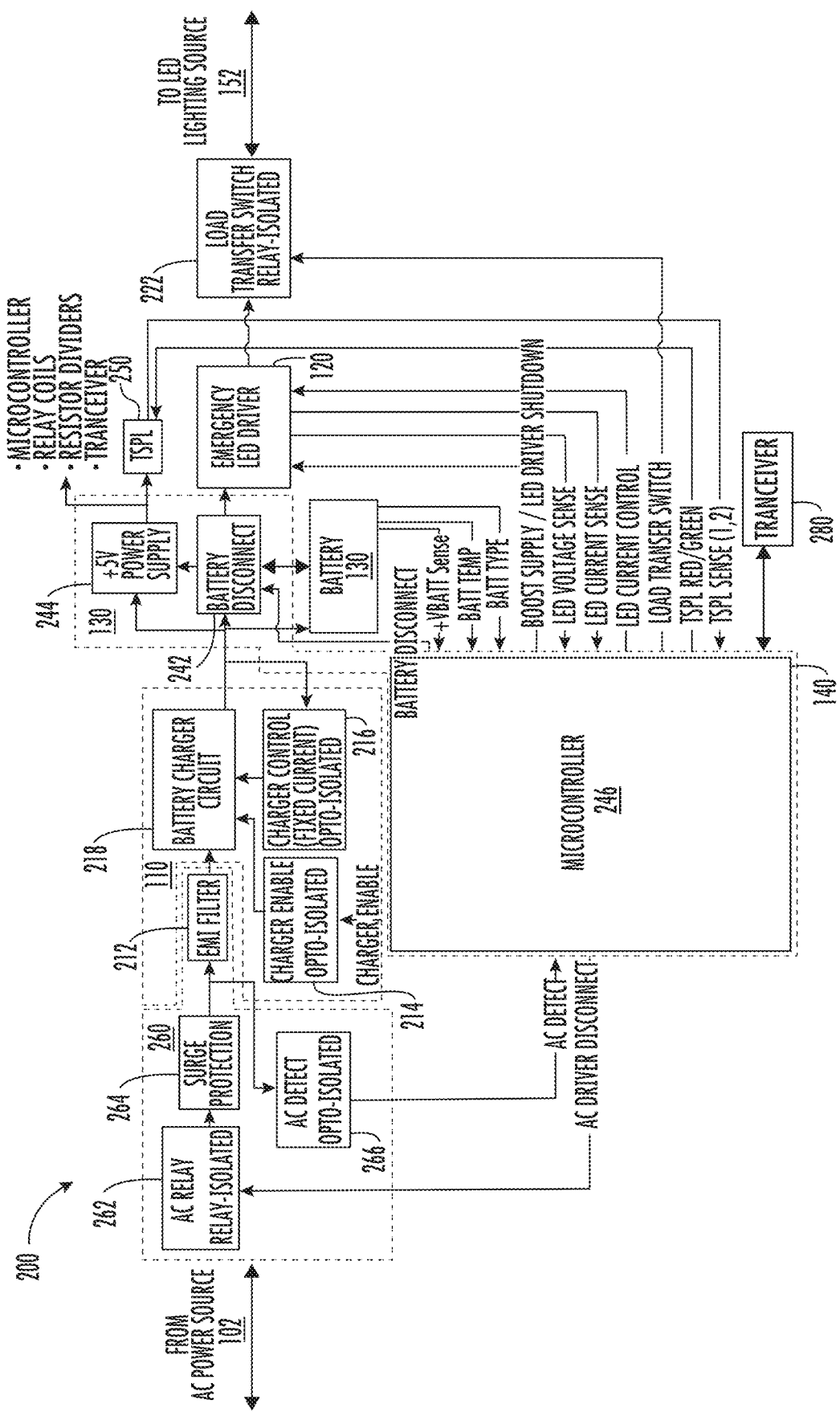
FIG. 2 is a block diagram of an example of an emergency LED lighting system according to one aspect of the present disclosure

FIG. 2 depicts the battery charger 110, emergency LED driver 120, battery pack 130, and controller 140 of FIG. 1 used in emergency LED lighting system 200. In this example, the emergency LED lighting system 200 further includes an AC module 260, a test switch pilot light ("TSPL") 250, a relay load transfer switch 222, and a transceiver 280. The AC module 260 includes an AC Relay 262, a surge protection circuit 264, an AC detect circuit 266, and EMI filter 212. The battery charger 110 includes a charger enable circuit 214, a charger controller 216, and a battery charger circuit 218. The controller 140 includes a 5 V power supply 244, a battery disconnect 242, and a microcontroller 246.

The AC detect circuit 266 can be conductively coupled to the output of the surge protection circuit 264 for detecting the presence or absence of power from the AC power source. For example, the AC detect circuit 266 can detect a loss of AC power and notify the microcontroller 246 such that the microcontroller 246 can enter an emergency mode. In the emergency mode the emergency LED driver 120 can provide power to an LED lighting source, via connection 152, using the battery pack 130. The microcontroller 246 can determine the power being provided to the LED lighting source using a voltage measured across the LED lighting source and a current measured at an output of the LED lighting source. The microcontroller can further provide instructions to the emergency LED driver 120 to adjust the current based on the power. For example, the microcontroller 246 can detect a change in power provided to the LED lighting source. The microcontroller 246 can instruct the emergency LED driver 120 to change the current provided to the LED lighting source such that the power remains substantially the same despite the change in voltage. If the microcontroller determines that the voltage measured across the LED lighting source indicates a short or an out of range LED lighting source (i.e., the measured voltage is inconsistent with the known rating for the LED lighting source), then the microcontroller may instruct the emergency Led driver to reduce the current to the LED lighting source.

The microcontroller 246 can instruct the battery disconnect 242 to connect or disconnect the battery 130 from the emergency LED driver 120. During emergency mode or test mode, the battery is connected to the emergency LED driver.

When the emergency lighting system 200 is in charging mode, the microcontroller 246 controls the battery disconnect 242 to disconnect the battery from the emergency LED driver 120 and controls the battery charger circuit 218, via the charger enable circuit 214, to charge the battery 130. When the lighting system is in emergency mode, the microcontroller 246 controls the battery disconnect 242 to connect the battery 130 to the emergency LED driver 120 and disables the battery charger 110. In some aspects, the emergency lighting system 200 may include a standby mode. In standby mode the system uses battery power even though AC power is available to reduce AC power consumption. When the emergency lighting system 200 is in standby mode, the microcontroller 246 can control the battery disconnect 242 to connect the battery to the emergency LED driver and control the charger enable circuit to disable the battery charger 110. The emergency lighting system 200 may cycle between charging mode and standby mode.

In some aspects, the battery 130 can be removable and modular such that a variety of different battery packs configurations or batteries can be used with the emergency LED lighting system 200. Any suitable type of battery may be used including, but not limited to, single-cell or multi-cell non-rechargeable or rechargeable batteries, lithium batteries, alkaline batteries, or atomic batteries. The emergency LED lighting system 200 may use batteries with a range of output voltages and discharge rates.

In some aspects, the TSPL 250 can include an LED for providing a visual indication of the status of the emergency LED lighting system 200. In additional or alternative aspects, the TSPL 250 can be used to communicate with remote devices by blinking or flashing a signal. The transceiver 280 can be communicatively coupled to (or included in) the microcontroller 246 for allowing the microcontroller 246 to communicate with other lighting systems and lighting drivers using any suitable protocol including, but not limited to, the LEDCODE protocol. Other types of transceivers and other communication protocols may also be used.

The controller 140 can include one or more processors that execute computer-executable program code stored in a memory device, access information stored in the memory device, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, and network transmission, among others.

Examples of a processor include an application-specific integrated circuit, a field-programmable gate array, or any other suitable processing device. The processor can include any number of processing devices, including one. The processor can include or communicate with the memory device. The memory device can store program code that, when executed by the processor, causes the processor to perform the operations described in this disclosure.

The memory can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include Assembly language, C, C++, C#, Visual Basic, Java, Python, Perl, JavaScript, ActionScript, etc.

The microcontroller can execute program code, which can include an emergency lighting engine stored on a non-transitory computer-readable medium. The emergency lighting engine can be executed to perform various operations described herein.

The operations include, but are not limited to: maintaining approximately constant power to the LED lighting source based on measured voltages and currents provided to the LED lighting source; rolling back or decreasing power provided to an LED lighting source over time in order to increase the amount of time the battery can power the LED lighting source; executing a soft start procedure, such that the power provided to the LED lighting source is gradually ramped up during activation of the LED lighting sources; identifying a type of battery coupled to the emergency LED lighting system 200; cycling the emergency LED lighting system 200 between charging mode and standby mode to reduce power consumption over a window of time; detecting AC power or an absence of AC power; and using a status LED to communicate information about the emergency LED lighting system with a remote device.

Although not depicted in FIGS. 1-2, the emergency lighting system can include any type of diode-based lighting sources including, but not limited to LEDs OLEDs, qLEDs, SLEDs, laser diodes, etc. The lighting sources can include one or more devices of various types. The lighting sources can be modular and replaceable. The emergency lighting system can operate with different lighting sources with different operating voltages. The lighting sources, such as LEDs, may be arranged in series, in parallel, or any combination thereof and different types of LEDs may be included in the same lighting system.

The number, type, and arrangement of devices depicted in FIGS. 1-2 are provided for illustrative purposes. Additional and/or different devices may be used.

Providing Constant Power to an LED Light Source Using a SEPIC Converter

In some aspects, emergency LED lighting systems maintain approximately constant power over a wide range of LED load voltages. The emergency LED drivers disclosed herein can use voltage and/or current feedback from an LED lighting source in order to maintain approximately constant power.

Figure 3:
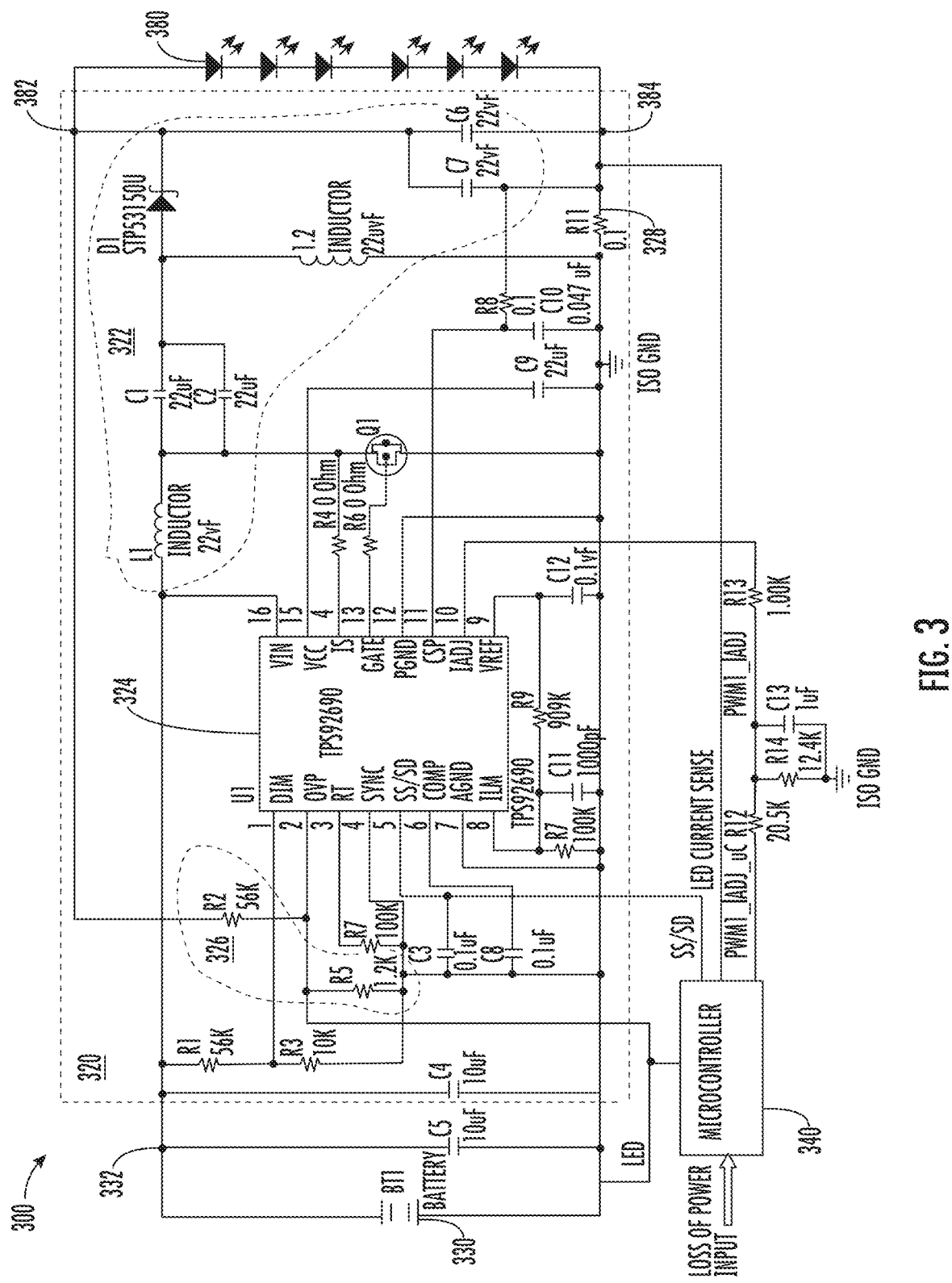
FIG. 3 is a schematic diagram of an example of a circuit for maintaining constant power output for emergency lighting according to one aspect of the present disclosure.

FIG. 3 depicts an example of an emergency LED driver 320 in an emergency LED lighting system 300 for providing approximately constant power to an LED lighting source 380. The emergency LED lighting system 300 can include the emergency LED driver 320, a battery 330, a microcontroller 340, and the LED lighting source 380. The emergency LED driver 320 can be conductively coupled to the battery 330 at a first battery connection point 332 and a second battery connection point 334. The emergency LED driver 320 can also be conductively coupled to the LED lighting source 380 at a first LED lighting source connection point 382 and a second LED lighting source connection point 384.

The emergency LED driver 320 can include a current converter 322, a current controller 324, a voltage sensor 326, and a current sensor 328. In one implementation, the current controller uses the TPS92690 current controller provided by Texas Instruments, but other implementations may use other controllers or components. In this example, the current converter 322 includes a single-ended primary inductor converter ("SEPIC"). The SEPIC includes capacitors C1 and C2 in the DC current path, which can cause the current converter 322 to exhibit an inherent degree of short circuit protection. This implementation can use two standard inductors, L1 and L2, and does not require a custom transformer.

The voltage sensor 326 can include a resistor divider in parallel to the LED lighting source 380. In this example, the voltage sensor 326 includes two resistors, R2 and R5 that are coupled in series. R2 is coupled to the first LED lighting source connection point 382 and R5 is coupled to the second LED lighting source connection point 384. The voltage at a point between the two resistors can be input to the microcontroller 340 on the LED voltage sense line in FIG. 3. The microcontroller 340 can determine the voltage across the LED lighting source 380 based on the voltage on the LED voltage sense line and the resistances of R2 and R5, which can be predetermined. The voltage between R2 and R5 can also be input to the current controller 324, e.g. via an input for over voltage protection.

The current sensor 328 can include a current sense resistor R11 coupled to the second LED lighting source connection point 384. The voltage across R11 can be input to the microcontroller 340 on the LED current sense line shown in FIG. 3. The microcontroller 340 can determine the current passing through the LED lighting source 380 based on the voltage on the LED current sense line and the resistance of R11, which can be predetermined.

The microcontroller 340 can use the LED voltage sense and LED current sense inputs to determine the power being provided to the LED lighting source 380. The microcontroller can also detect changes in the power being provided to the LED lighting source 380. The microcontroller 340 can transmit a signal to the current controller 324 to adjust the current. In this example, the microcontroller 340 transmits a signal to the current adjust input of the current controller 324. The microcontroller 340 can gradually adjust the voltage on the current adjust input to instruct the current controller 324 to adjust the current output by the current converter 322.

Figure 4:
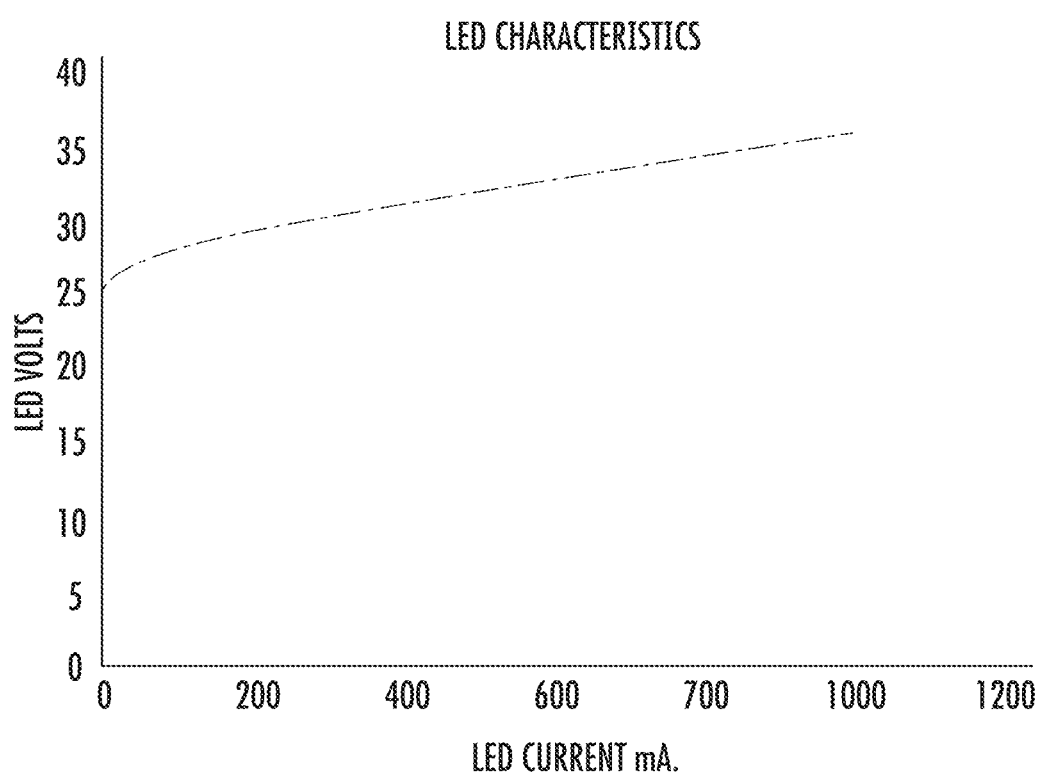
FIG. 4 is a graph of an example of an LED characteristic curve according to one aspect of the present disclosure.

FIG. 4 depicts a graph of an example of a characteristic curve for the LED lighting source 380 in FIG. 3. The controller 140 can detect faults (e.g., short circuits and open circuits) by comparing the measured values received via the LED voltage sense and LED current sense inputs with the expected values on the LED characteristic curve. For example, upon detecting a loss of AC power and entering emergency mode, the microcontroller 340 can instruct the current controller 324 to increase the current, from substantially zero, by ramping up the voltage output on the current adjust line connected to the current controller 324. In one example, the microcontroller outputs a pulse width modulated signal to adjust the current, which can be filtered to obtain an analog control level. Initially the micocontroller 340 can instruct the current controller 324 to keep the current output by the current converter 322 low while the microcontroller 340 monitors the voltage across the LED lighting source 380 by monitoring the voltage on the LED voltage sense line.

As shown by the LED characteristic curve in FIG. 4, a voltage across the LED lighting source 380 can be present even at very low current levels (e.g., 1-5 mA). Thus, if the microcontroller 340 detects no voltage, or a voltage below a predetermined fault voltage, across the LED lighting source 380, the microcontroller 340 can determine a short has occurred. In response to detecting the short, the microcontroller 340 can instruct the current controller 324 to reduce the current output by the current converter 322.

In response to the microcontroller 340 detecting a voltage across the LED lighting source 380 within a predetermined range, the microcontroller 340 can instruct the current controller 324 to increase the current output by the current converter 322. The microcontroller 340 can continue to monitor a voltage across the LED lighting source 380 as the current passing through the LED lighting source 380 is increased. In some examples, the current controller 324 can continue to ramp-up the current output by the current converter 322 until a predetermined power level is detected by the microcontroller 340. The microcontroller 340 can continue monitoring the power provided to the LED lighting source 380 and instruct the current controller 324 to adjust the current output by the current converter 322 as necessary to maintain a predetermined power level. In some aspects, the microcontroller 340 can determine the power provided to the LED lighting source 380 by multiplying the voltage determined to be across the LED lighting source 380 by the current determined to be passing through the LED lighting source 380. Additionally or alternatively, the power can be determined by a "look-up" table of corresponding current levels for given LED voltages. By monitoring the power provided to the LED lighting source 380 and instructing the current controller 324 to adjust the current output by the current converter 322, the power provided to the LED lighting source 380 can be maintained regardless of changes in the voltage provided by the battery as the battery 130 discharges.

In this example, the current controller 324 includes an overvoltage shutdown function. The current controller 324 can monitor the voltage provided by the battery 130 using a resistor divider including R1 and R3. The current controller 324 can also monitor the voltage provided to the LED lighting source 380 using the voltage sensor 326. In response to detecting a voltage from the battery 130 or across the LED lighting source 380 that exceeds a predetermined threshold value, the current controller 324 can reduce the current being output by the current converter 322. In additional or alternative examples, the microcontroller 340 can detect an open-circuit condition due to the voltage across the LED lighting source 380 exceeding the predetermined threshold value, or a fault voltage level, and instruct the current controller 324 to reduce the current output by the current converter 322.

By continuously or periodically monitoring the voltage across the LED lighting source 380 and the current through the LED lighting source 380, the emergency LED lighting system can resume operation upon removal of a detected fault. For example, in the case of a short, the voltage across the LED lighting source 380 determined by the microcontroller 340 can be very low (e.g., below a predetermined fault voltage). The microcontroller 340 can instruct the current controller 324 to keep the current output by the current converter 322 at a fault current level. The fault current level can be a predetermined value that is less than a range of operating current levels, which are used during an emergency mode to provide power to the LED lighting source 380. In response to the fault being removed, a voltage across the LED lighting source above the fault voltage threshold may be sensed by the microcontroller 340 and may trigger the microcontroller to increase the current to the LED lighting source.

In the case of an open circuit, the voltage across the LED lighting source 380 may be above a threshold voltage or a predetermined fault voltage. The microcontroller 340 can instruct the current controller 324 to keep the current output by the current converter 322 at the fault current level. When the open circuit is resolved (e.g., the LED lighting source 380 is reconnected), the microcontroller 340 can sense a voltage across the LED lighting source 380 within a proper range and can transmit instructions for ramping up the current to the desired operating level.

Providing Constant Power to an LED Lighting Source Using a Boost Converter

Figure 5:
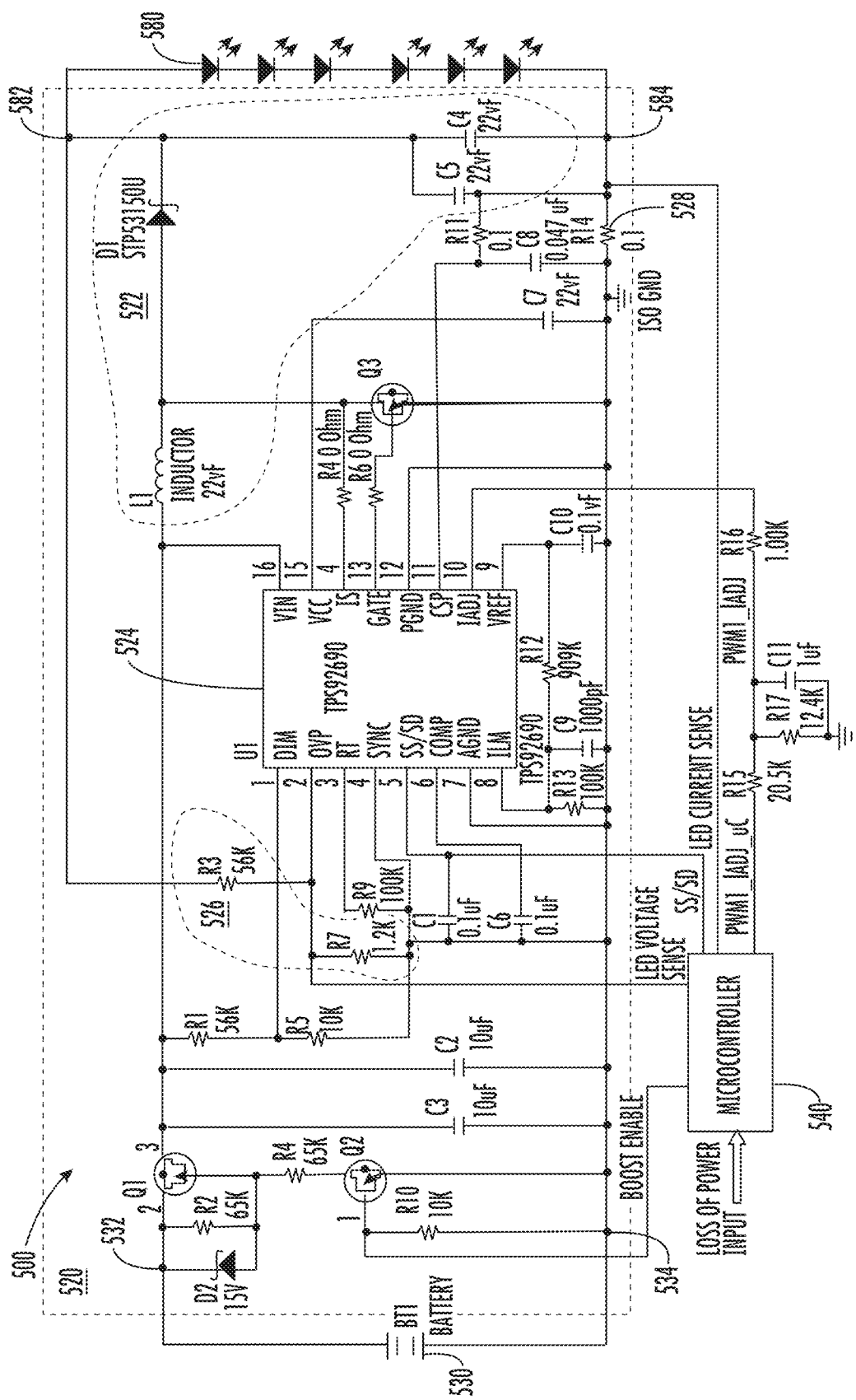
FIG. 5 is a schematic diagram of another example of a circuit for maintaining constant power output for emergency lighting according to one aspect of the present disclosure.

FIG. 5 depicts another example of an emergency LED driver 520 included in an emergency LED lighting system 500 for providing approximately constant power to an LED lighting source 580. The emergency LED lighting system 500 can include the emergency LED driver 520, a battery 530, a microcontroller 540, and the LED lighting source 580. The emergency LED driver also includes a voltage divider 526 and a current sense resister 528. The emergency LED driver 520 can be conductively coupled to the battery 530 at a first battery connection point 532 and a second battery connection point 534. The emergency LED driver 520 can also be conductively coupled to the LED lighting source 580 at a first LED lighting source connection point 582 and a second LED lighting source connection point 584.

In this example, the current converter 522 includes a boost converter. Unlike the SEPIC converter in FIG. 3, the boost converter includes no DC blocking capacitors between the battery 530 and the LED lighting source 580 so the converter cannot regulate below battery voltage. To address a short-circuit fault or a condition where the LED voltage is below the battery voltage, the emergency LED driver 320 includes a switch Q1 in series between the first battery connection point 532 and the current converter 522. The switch Q1 can be controlled by the microcontroller 540 to connect and disconnect the current converter 522 from the battery 530. For example, the microcontroller 540 can open Q1 and disconnect the current converter 522 from the battery 530 in response to detecting the voltage across the LED lighting source 580 is below battery voltage. In some examples, the microcontroller can also detect a fault by detecting a current that exceeds a predetermined fault level as measured by the current sensor 528. The microcontroller 540 can be configured to retry operation by closing the switch Q1 at a periodic rate. Once the fault has been corrected, the microcontroller can restore power to the LED lighting source 580.

The circuits of FIGS. 3 and 5 may be used in a feed forward manner by using battery voltage instead of LED voltage for the power calculations. If battery voltage is used, then the input power to the current converter is controlled. The LED power differs from the calculated power by the amount of any converter losses.

Providing Constant Power to an LED Lighting Source Using a Transformer

Figure 6:
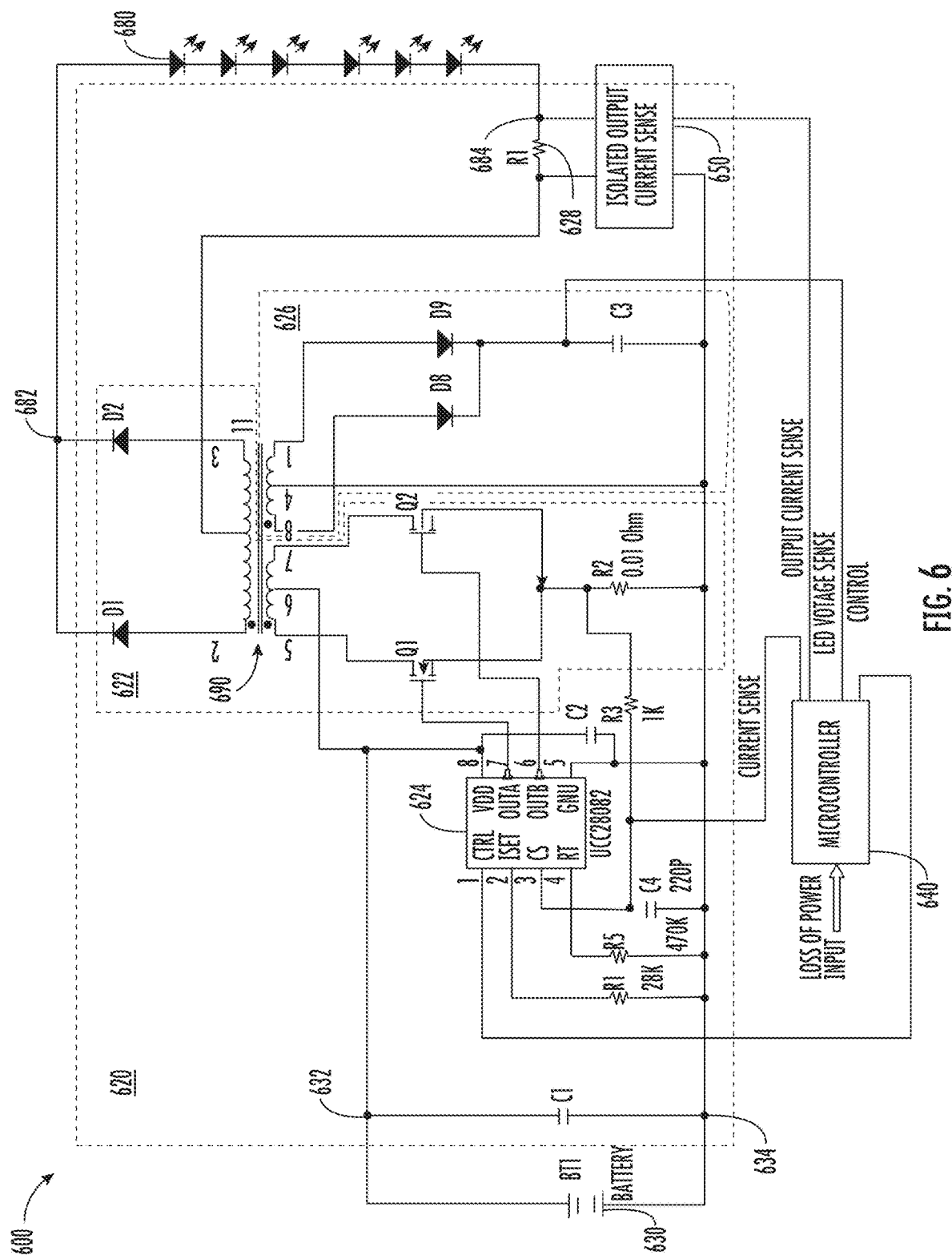
FIG. 6 is a schematic diagram of another example of a circuit for maintaining constant power output for emergency lighting according to one aspect of the present disclosure.

Some LED lighting loads may require a higher voltage than what may be provided by a SEPIC or boost converter. In some examples, an emergency LED lighting system can use a transformer to provide high voltage constant power. FIG. 6 depicts an example of an emergency LED driver 620 included in an emergency LED lighting system 600 for providing approximately constant power to an LED lighting source 680. The emergency LED lighting system 600 can include the emergency LED driver 620, a battery 630, a microcontroller 640, and the LED lighting source 680. The emergency LED driver 620 can be conductively coupled to the battery 630 at a first battery connection point 632 and a second battery connection point 634. The emergency LED driver 620 can also be conductively coupled to the LED lighting source 680 at a first LED lighting source connection point 682 and a second LED lighting source connection point 684.

In this example, the emergency LED driver 620 includes a transformer 690 in a push-pull configuration controlled by a converter 622 that includes switching transistors Q1 and Q2, resistor R2, and output diodes D1 and D2. The power provided to the LED lighting source 680 can be adjusted by the current controller 624 controlling a duty cycle of the switching transistors Q1 and Q2. The magnetic utilization in this example is good because the magnetic core is being driven in both directions. The transformer 690 can provide galvanic isolation between the battery-powered low-voltage circuits and the LED lighting source 680. This separation can be beneficial since the LED lighting source 680 and the emergency LED driver 620 may be of a high voltage configuration and may share common connections with the LED driver circuits.

In this example, a voltage sensor 626 can be used to determine the voltage across the LED lighting source 680. The voltage sensor 626 can include a divider formed by a pair of diodes coupled to opposite ends of a transformer winding and coupled in series with a capacitor C3. A voltage between the pair of diodes D8, D9 and the capacitor C3 can be provided as an input to the microcontroller 640 on the LED voltage sense line. The microcontroller 640 can determine the voltage across the LED lighting source 680 based on the voltage on the LED voltage sense line and the capacitance of C3.

In this example, an isolated current sensor 650 can measure a voltage across the current sense resistor 628 and output a voltage on an output current sense line connected to the microcontroller 640. The microcontroller can determine the current passing through the LED lighting source 680 based on the voltage on the output current sense line.

Figure 7:
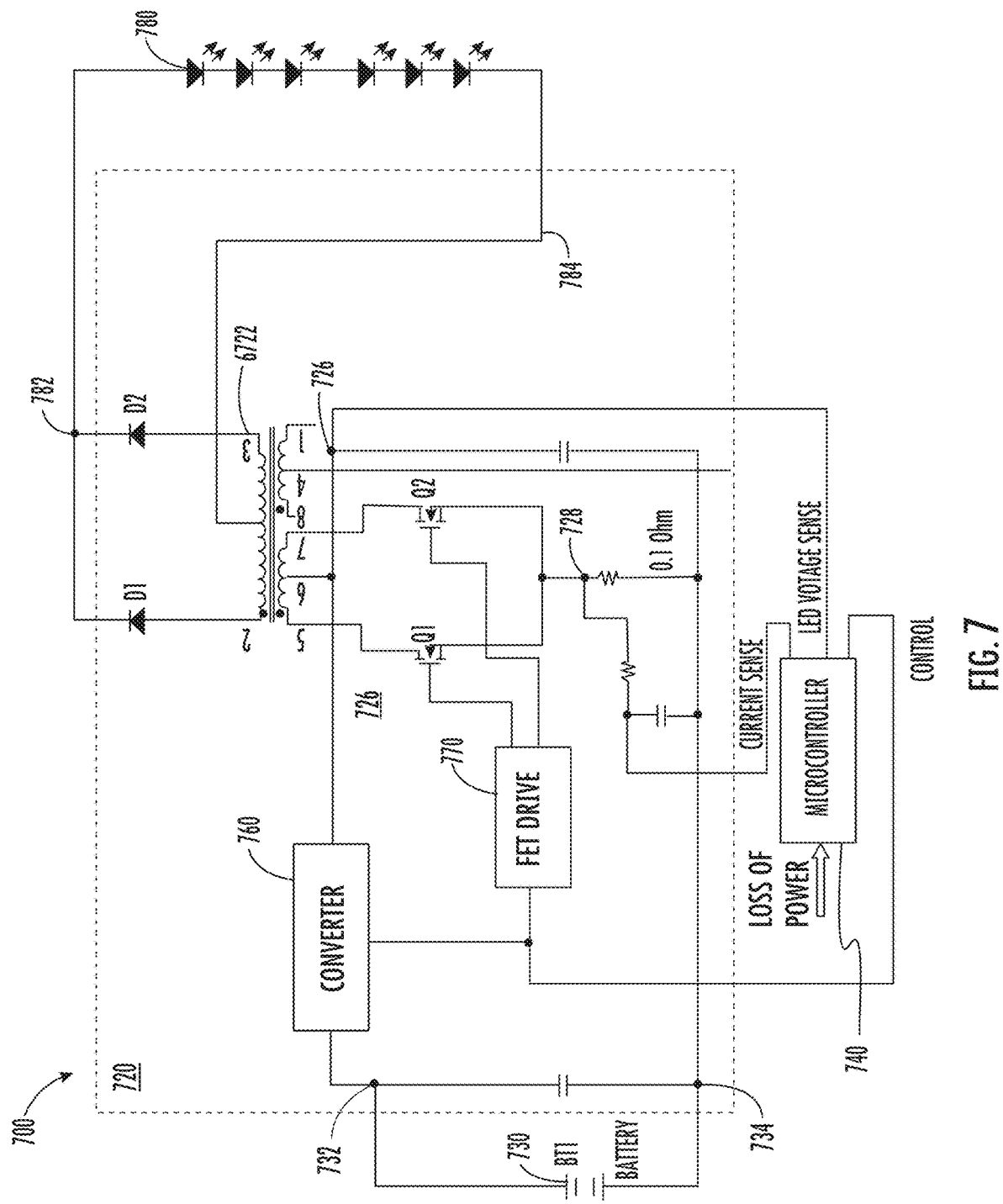
FIG. 7 is a schematic diagram of another example of a circuit for maintaining constant power output for emergency lighting according to one aspect of the present disclosure.

FIG. 7 depicts another example of an emergency LED driver 720 included in an emergency LED lighting system 700 for providing approximately constant power to an LED lighting source 780. The emergency LED lighting system 700 can include the emergency lighting driver 720, a battery 730, a microcontroller 740, and the LED lighting source 780. The emergency LED driver 720 can be conductively coupled to the battery 730 at a first battery connection point 732 and a second battery connection point 734. The emergency LED driver 720 can also be conductively coupled to the LED lighting source 780 at a first LED lighting source connection point 782 and a second LED lighting source connection point 784.

In this example, the emergency LED driver 720 includes a converter 760, a FET driver 770, a transformer 722, a voltage sense point 726, and a current sense point 728. Transistors Q1 and Q2 may be driven in a full conduction period although some "dead time" may be required between transitions. The microcontroller 740 can control the power provided to the LED lighting source 780 by providing control signals to the FET driver 770 and the converter 760.

The voltage across the LED lighting source 780 and the current through the LED lighting source 780 can be determined by circuits on the primary side of the transformer 722 such that additional isolated measurement techniques are not required. In this example, the microcontroller 740 can include an input for coupling to the current sense point 728. A voltage can be induced on the current sense line by the current sense point 728 based on the current passing through the LED lighting source 780. The microcontroller 740 can include another input for coupling to an LED voltage sense line. A voltage can be induced on the LED voltage sense line based on the voltage across the LED lighting source 780. The microcontroller 740 can determine the power being provided to the LED lighting source 780 based on the voltages on the current sense line and the LED voltage sense line.

Conserve Energy at Low Temperatures by Performing Power Rollback

In some aspects, battery performance degrades with falling temperatures. Batteries (e.g., battery 130 in FIG. 2) can be made of various chemical compounds including NiCd, NiMH, or LiFePO4. Batteries can also include supercapacitors including a pair of conductors separated by an insulator. During periods of low temperatures, an emergency LED lighting system can rollback or decrease an output power of an emergency LED lighting driver in order to conserve battery life and provide emergency lighting for a predetermined minimum amount of time (e.g., 90 minutes per UL924 requirements). Generally, the colder the ambient temperature, the more degraded the performance of the battery. Therefore, in some examples, the colder the ambient temperature, the greater the power rollback.

The emergency LED lighting system can include or be communicatively coupled to a temperature sensor for determining an ambient temperature. In one example, the battery pack includes a temperature sensor and provides temperature information to the microcontroller. When the system enters emergency mode or test mode, the microcontroller may determine the ambient temperature for the battery pack and based on the temperature determine whether to implement power rollback. If the temperature is beyond a predetermined value (e.g., the temperature is less than a minimum temperature), the microcontroller can control the LED driver to rollback its output power based on a band in which the ambient temperature falls. Each band can be associated with a temperature range and indicate an amount of power rollback from rated power. Each band can include one or more rollback stages, which define an amount of time to decrease power. For example, an emergency LED lighting system can define the following temperature bands and rollback stages:

| i) | temperature >= 25° C. | (no rollback) | |
|---|---|---|---|
| ii) | 20° C. <= temperature < 25° C. | 3.3% (stage 1), 3.3% (stage 2) | (6.6% total) |
| iii) | 15° C. <= temperature < 20° C. | 6.6% (stage 1), 6.6% (stage 2) | (13.2% total) |
| iv) | 10° C. <= temperature < 15° C. | 9.9% (stage 1), 9.9% (stage 2) | (19.8% total) |
| v) | 5° C. <= temperature < 10° C. | 13.2% (stage 1), 13.2% (stage 2) | (26.4% total) |
| vi) | temperature < 5° C. | 16.5% (stage 1), 16.5% (stage 2) | (33% total) |

Figure 8:
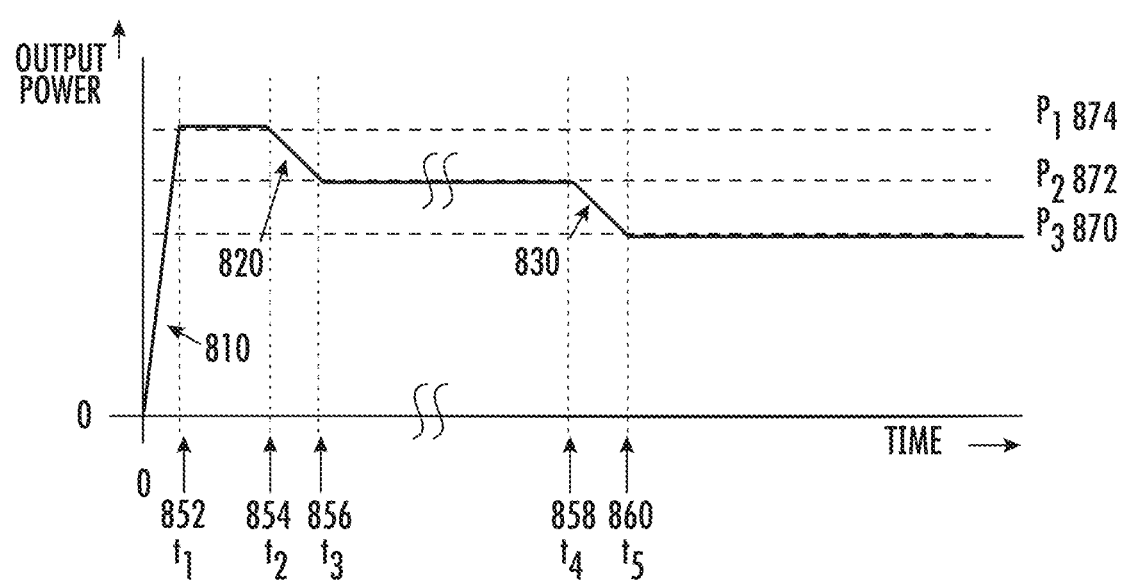
FIG. 8 is a graph of an example of power rollback of an emergency LED lighting system according to one aspect of the present disclosure.

FIG. 8 is a graph depicting an example of power rollback by the emergency LED lighting system 100 in FIG. 1. Although FIG. 8 is described in reference to the emergency LED lighting system 100 in FIG. 1, power rollback can be used with other emergency LED lighting systems or lighting systems with limited power sources. In this figure, time is not to scale due to the illustration of actions with both short and long time durations. Between time indicator 0 and $t_1$ 852, the LED driver gradually increases power to the LED lighting source from 0 to full rated power $P_1$ 874. The time between 0 and time indicator $t_1$ 852 may correspond to a 10-second "soft start" further explained below. Power is maintained at full rated power $P_1$ until time indicator $t_2$ 854. Stage 1 rollback 820 begins at time indicator $t_2$ 854 and ends at time indicator $t_3$ 856. Power is decreased from full rated power $P_1$ 874 to a reduced power level $P_2$ 872. Power is maintained at reduced power level $P_2$ 872 until time indicator $t_4$ 858. Stage 2 rollback 830 begins at time indicator $t_4$ 858 and ends at time indicator $t_5$ 860. Power is decreased from reduced power level $P_2$ 872 to reduced power level $P_3$ 870. After time indicator $t_5$ 860, power is maintained at reduced power level $P_3$ 870 until AC power is restored, test mode is exited, or the battery pack 130 is depleted and can no longer maintain emergency lighting power.

Other variations of power rollback are possible. For example, the temperature may be considered when emergency mode or test mode is initiated, may be considered at various points during emergency or test mode, or may be considered at each potential rollback stage. Operating characteristics other than temperature may also be considered, such as the age of the battery, the hours of operation of the battery, battery life calculations, etc. The timing of the rollback stages and the time between rollback stages may differ based on temperature, operating characteristic values, or other factors. The decrease in power during a rollback stage may be non-linear and the amount of the decrease may be different for different stages. The use of soft start is optional and not required for power rollback.

Activating Emergency LED Lighting Source Using a Soft Start

In some aspects, an emergency LED lighting system can activate LED lighting sources using a soft start. A soft start can include a process whereby an emergency LED lighting driver "gently" turns on its attached LED lighting source by gradually increasing its output current or power at a predetermined rate over time. A soft start may be used when the system enters emergency mode or test mode.

Figure 9:
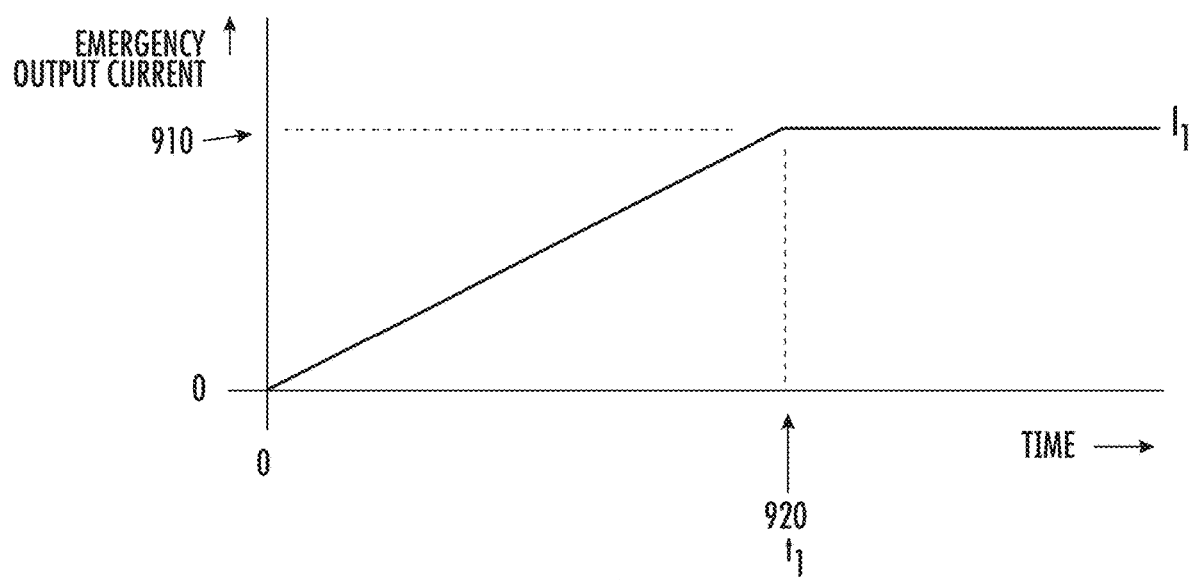
FIG. 9 is a graph of an example of a soft start of an emergency LED lighting system according to one aspect of the present disclosure.

FIG. 9 depicts a graph of an example of a soft start applied by the emergency LED lighting system 100. Although FIG. 9 is described in reference to the emergency LED lighting system 100 in FIG. 1, a soft start can be applied by other emergency LED lighting systems or other battery powered systems. During the soft start, the controller 140 can instruct the emergency LED driver 120 to adjust its output current from zero up to a current associated with the emergency current $I_1$ 910 over the course of a short time period, $0-t_1$ (e.g., 10 seconds).

In some aspects, gradually increasing the current can minimize in-rush current in the circuitry components and can place less strain on the battery pack 130 that is supplying the power, which can improve the lifespan of the battery pack 130. In additional or alternative aspects, gradually increasing the current draw from the battery pack 130 when entering the test mode or the emergency mode can lessen the initial voltage "droop" (especially at cold ambient temperatures) when compared to pulling full emergency power current from the battery pack 130 when entering emergency mode or test mode. Although FIG. 9 depicts a linear increase in emergency output current, other non-linear implementations of a soft start are possible.

Identifying Battery Coupled to the Emergency LED Lighting System

Figure 10:
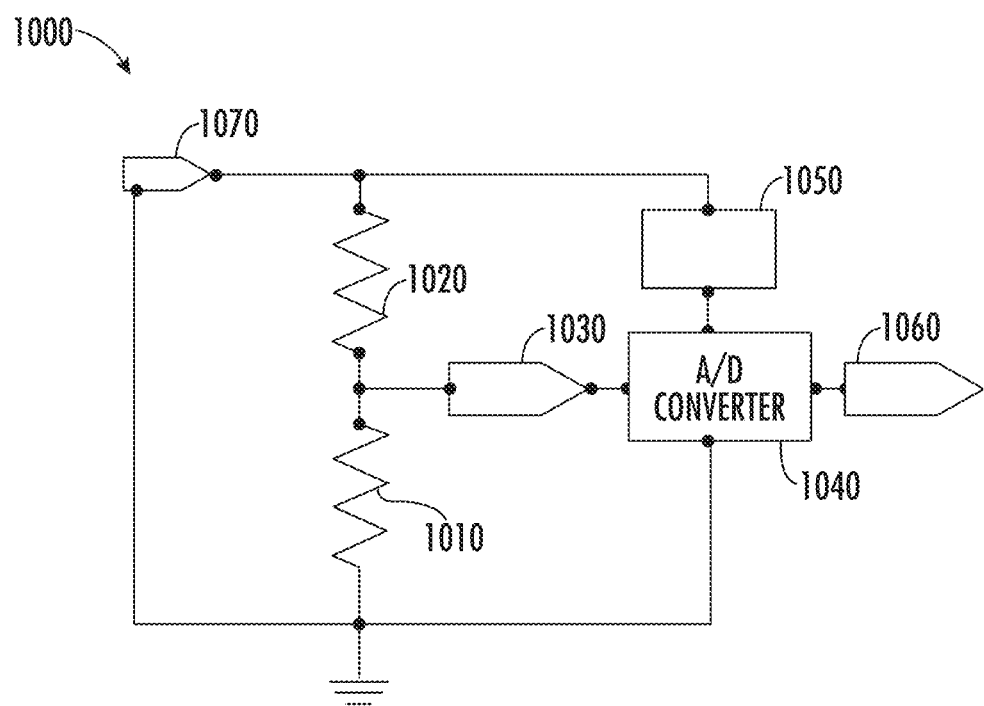
FIG. 10 is a schematic diagram of an example of a battery identification circuit for an emergency LED lighting system according to one aspect of the present disclosure.

An emergency LED lighting system can be coupled to different types of battery packs. The emergency LED lighting system described herein can accurately identify the type of battery pack and then adjust its operation accordingly. Exemplary adjustments may include adjustments to emergency output voltage, current and power, battery voltage ranges, as well as battery charge current, battery charge time, and battery capacity gauge. In some aspects, the system uses a two-resistor divider to identify the type of battery pack. FIG. 10 depicts an example of a battery identification circuit 1000 that can be included in the emergency LED lighting system 100. Although FIG. 10 is described in reference to the emergency LED lighting system 100 in FIG. 1, other implementations are possible. The battery identification circuit 1000 can include a resistor divider formed by resistor 1010 and resistor 1020. The resistor divider can be coupled between a voltage bus 1070 and ground. In one example, the voltage bus is a 5-volt bus. Resistor 1020 has a known resistance and is installed on a circuit board associated with the system. Resistor 1010 is installed in the battery pack and identifies the type of battery pack. Different types of battery packs have different values of resistors. The voltage 1030 between the two resistors 1010, 1020 is provided to an analog-to-digital converter ("ADC") 1040. A reference voltage 1050 is also provided to the ADC. The output of the ADC 1040 provides a digital value that the microcontroller uses to determine the type of battery pack. In some implementations, the ADC is provided by the microcontroller and the reference voltage is generated within the microcontroller.

Battery packs of the same type (e.g., the same # of cells, voltage, battery chemistry, etc.) can use a resistor 1010 with the same value so that the digital value 1060 is the same for battery packs of the same type. In one implementation, the microcontroller uses a table to determine the type of battery pack from the digital value.

In some aspects, the microcontroller can further determine that an unsupported battery pack or no battery pack is attached to the emergency LED lighting system based on the digital voltage 1060. For example, if an unsupported battery pack (e.g., without resistor 1010 or with a resistor having an unknown value) is coupled to the emergency LED lighting system 100, the digital value 1060 will not be an expected value or within an expected range of values and the system can determine that no battery pack or an unsupported battery pack is installed. Accurately and reliably identifying the battery pack can increase the reliability of the emergency LED lighting system 100 and enhance the ability of the emergency LED lighting system 100 to report possible error conditions to a user through either visual indication or through other means of communications. Using the resistor divider of FIG. 10 is more accurate than other types of battery pack identification approaches which attempt to identify the type of battery pack by sampling outputs of an attached battery pack over time and comparing the sampled outputs with expected outputs from a variety of different batteries.

Standby Mode to Reduce Energy Consumption

In some aspects, the energy consumption of an emergency LED lighting system may be adjusted so the system meets energy consumption regulations, such as California Energy Commission ("CEC") Title 20. For example, an emergency LED lighting system can enter a standby mode in response to detecting that the battery voltage exceeds a predetermined voltage. During standby mode, the emergency LED lighting system can turn off or disable its battery charger circuit, and draw power from the battery, thereby reducing the energy consumed from the AC mains power during standby mode to nearly zero. The emergency LED lighting system can remain in standby mode (consuming energy from the battery) until the battery voltage decreases to a predetermined value, referred to herein as a recharge voltage, $V_{Recharge}$. $V_{Recharge}$ can be selected to ensure that the battery maintains sufficient energy to power the LED lighting source for a predetermined minimum amount of time during emergency mode. In response to the battery voltage decreasing to, or below, $V_{Recharge}$, the emergency LED lighting system can enter a charging mode. In the charging mode, the emergency LED lighting system can turn on its battery charger circuit and charge the battery to a predetermined voltage, $V_{Full}$. In response to the battery being charged to $V_{Full}$, the emergency LED lighting system can again enter the standby mode. In some aspects, the cycle of switching between the standby mode and the charging mode can continue as long as power is present on the AC mains power. In additional or alternative aspects, the cycle can be interrupted by the emergency LED lighting system entering a test mode or an emergency mode. For example, the emergency LED lighting system can switch to an emergency mode in response to AC power being lost at any time during the charging mode or standby mode.

The emergency LED lighting system can use battery characteristics other than voltage for determining when to enter standby mode or charging mode. In some examples, the emergency LED lighting system can monitor current, power, or stored amp-hr. In additional or alternative examples, the emergency LED lighting system can include a clock and can switch between standby mode and charging mode based on time. By integrating the total power consumed from the AC mains over time when the emergency LED lighting system cycles between charging mode and standby mode, the system can meet energy consumption requirements, such as the Title 20 requirements.

Figure 11:
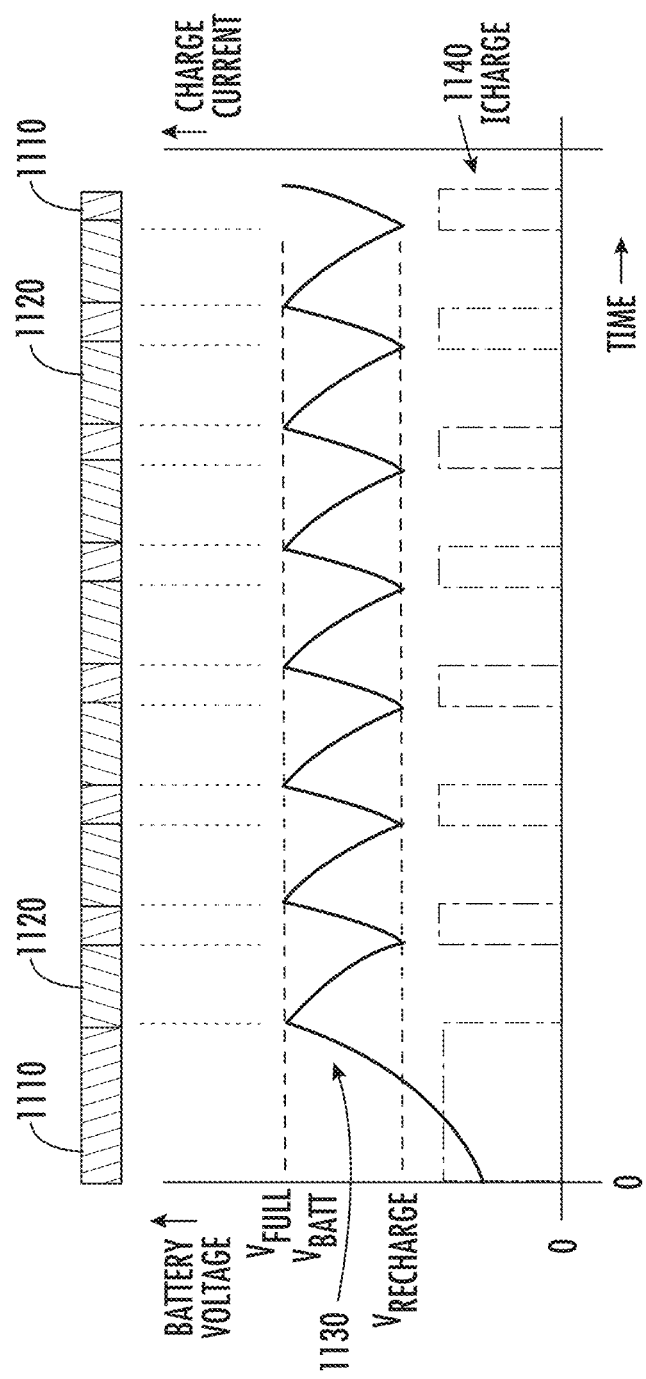
FIG. 11 is a graph of an example of an emergency LED lighting system cycling through charging modes and standby modes according to one aspect of the present disclosure.

FIG. 11 graphically depicts an example of an emergency LED lighting system cycling between a charge mode 1110 and a standby mode 1120 with respect to a battery voltage, $V_{Batt}$ depicted over time by line 1130 and charge current, $I_{Charge}$ depicted over time by line 1140. In this example, line 1140 indicates that $I_{Charge}$ has a first constant value during the charge mode 1110 and a second constant value during the standby mode 1120, but $I_{Charge}$ may have other suitable values.

Figure 12:
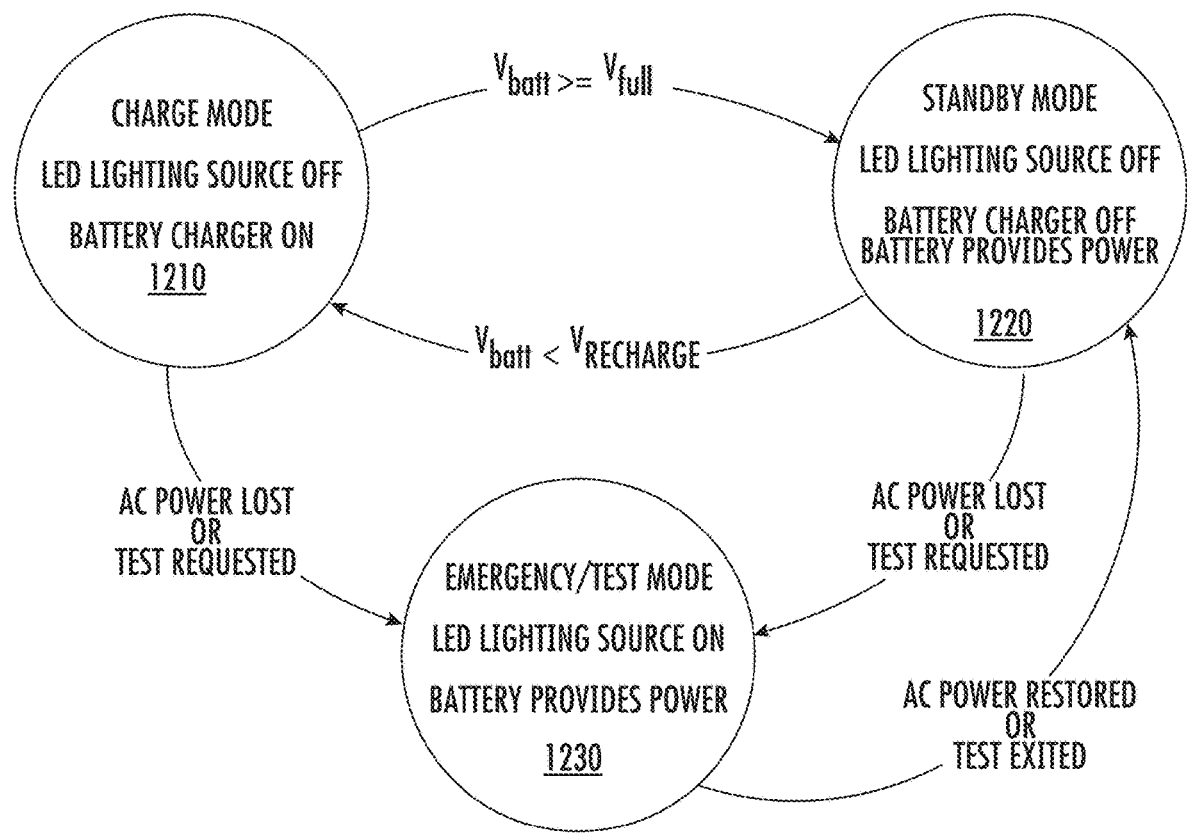
FIG. 12 is a flow chart of an example of a process for reducing an average draw on a grid by an emergency LED lighting system according to one aspect of the present disclosure.

FIG. 12 illustrates an example process for implementing a standby mode to reduce energy consumption of the emergency LED lighting system 100. Although FIG. 12 is described in terms of the emergency LED lighting system 100, the process may be implemented for reducing the energy consumption of other emergency LED lighting systems.

In block 1210, the battery is charged using the battery charger 110. The battery charger 110 can be activated by the controller 140 based on the controller's 140 monitoring of a characteristic of the battery or an output of the battery pack 130. The system may remain in charge mode until the battery voltage reaches $V_{Full}$, a predetermined time interval expires, or the system enters emergency or test mode.

In block 1220, the battery charger 110 can be disconnected from the AC power source in response to the emergency LED lighting system 100 entering standby mode. The battery provides power to run the emergency LED lighting system 100 and thereby reduces power drawn from the AC power source to nearly zero. The system may remain in standby mode until the battery voltage reaches $V_{Recharge}$, a predetermined time interval expires, or the system enters emergency or test mode. If the battery voltage reaches $V_{Recharge}$ or the predetermined time interval expires, the system may return to block 1210 and connect the battery charger 110 to the battery to enable charging mode. If the system enters emergency or test mode, the battery may continue to provide power to the system. In block 1230, the LED emergency driver 120 provides power to the LED lighting source using the battery in response to the controller 140 determining that the emergency LED lighting system 100 is in emergency mode or test mode.

Detecting AC Power

In some aspects, regulatory requirements for power supplies and battery chargers have significantly reduced the total allowable power consumption of these types of devices. In one instance the requirement is a total power level of less than 1 watt. One approach to address these requirements is to place the device in a low power or idle mode when power is not required by a load. Since some emergency LED lighting systems use an output voltage of a charger circuit to determine the presence or absence of AC power, the charger circuit remains powered during idle mode. Disabling the charger circuit for these systems disables the emergency lighting system's ability to detect a loss of AC power.

An emergency LED lighting system can include a separate low power circuit to detect the presence or absence of AC power and convey this information to other devices in the system. The use of a low power AC detection circuit allows the system to reduce its total power consumption while still allowing the system to detect a loss of AC power.

Figure 13:
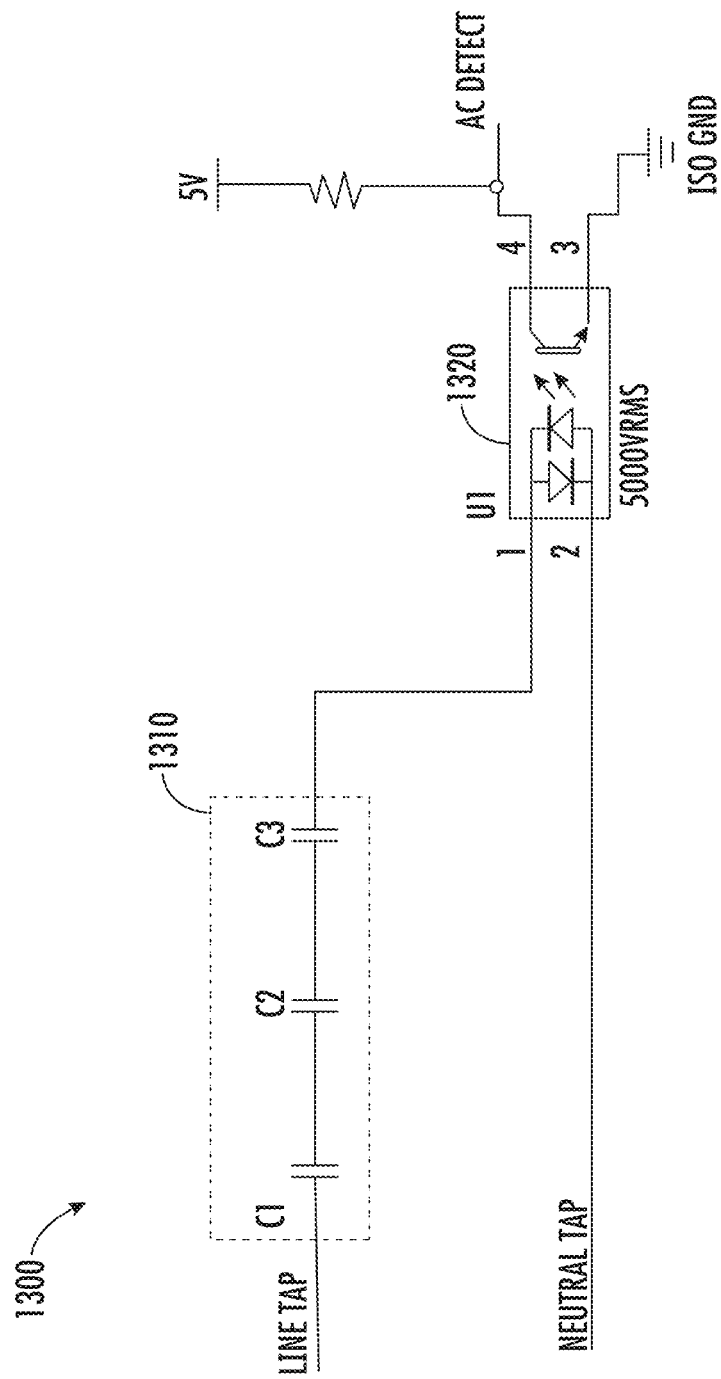
FIG. 13 is a schematic diagram of an example of an AC detect circuit that includes capacitive elements according to one aspect of the present disclosure.

FIG. 13 depicts an example of an AC detection circuit 1300 that includes a capacitive element 1310. In one example, multiple capacitors (C1, C2, and C3) coupled in series form the capacitive element. The capacitive element is coupled between an the AC power source and opto-isolator 1320. In one example the capacitance of the capacitive element is 0.22 µF and the circuit provides a drive current of 10 mA for the opto-isolator 1320 at 120 volts 60 Hz. The current can increase to 23 mA at 277 volts.

The opto-isolator 1320 in the circuit depicted in FIG. 13 can have a wide sensitivity range and lack a precise "trigger point" for line voltage detection. In some examples, stray voltages can exist on circuits that have been disabled or turned off. These stray voltages can be at a 10-volt level or even higher depending on conductor length and proximity to other conductors and can cause voltage to be improperly detected.

Figure 14:
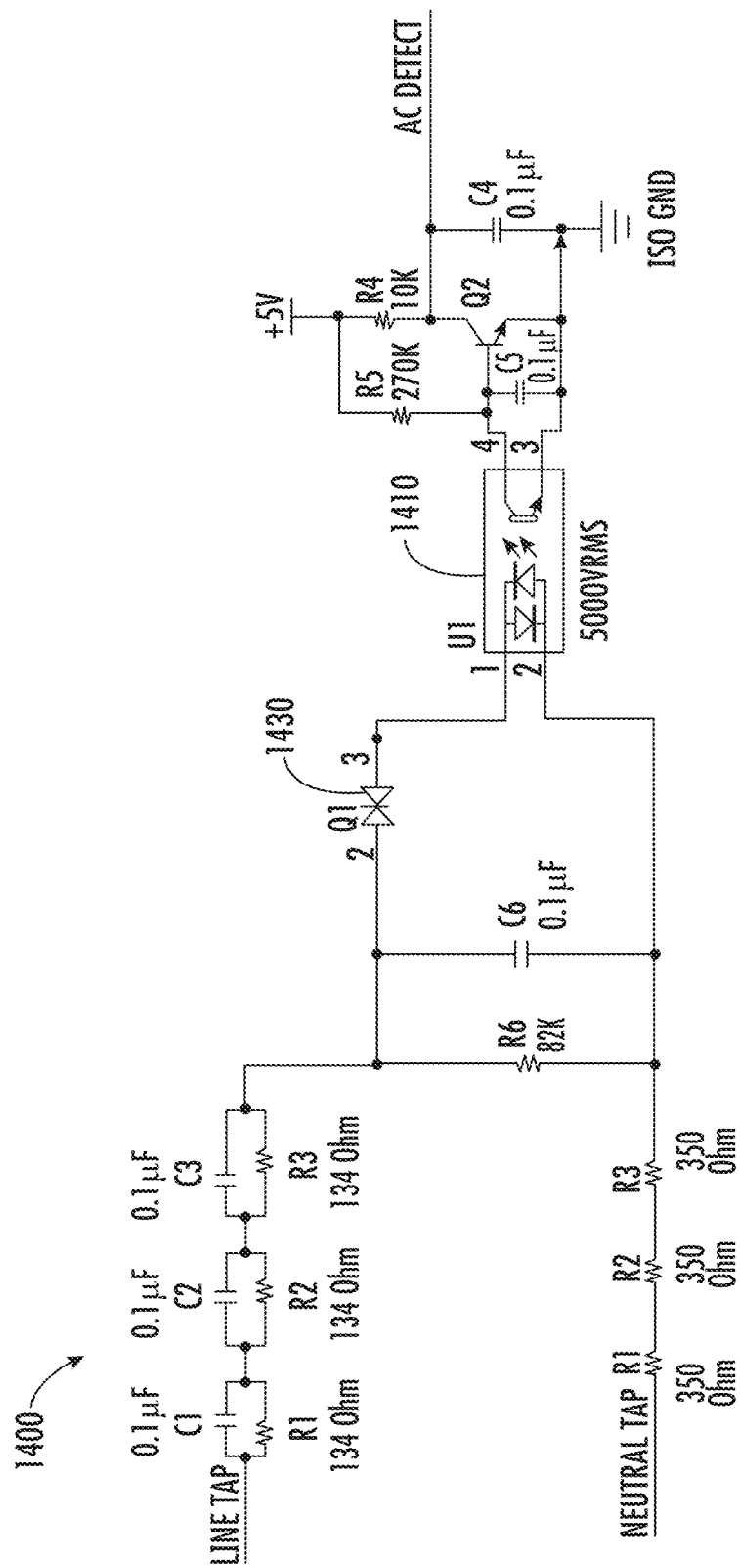
FIG. 14 is a schematic diagram of an example of an AC detect circuit with low power consumption for coupling to an emergency LED lighting system according to one aspect of the present disclosure.

FIG. 14 is an example of another AC detection circuit 1400 that includes a DIAC semi-conductor device 1430 to provide a more precise "trigger" point and to provide hysteresis. The AC detection circuit 1400 includes the DIAC 1430 for establishing a definite threshold and provides pulses to the opto-coupler 1410 instead of a continuous DC level. By providing pulses to the opto-coupler 1410 the AC detection circuit 1400 can prevent unnecessary losses and decrease total standby power as compared to circuits that provide a constant DC power to the opto-coupler 1410. The current required can be much less and the components forming the series capacitive impedance can be much smaller. In this example, the operating current is only 3.5 mA at 277 volts. The opto-coupler provides dielectric isolation between AC line voltage and the logic and control circuits and components. Resistors R1, R2, and R3 provide voltage balance and do not significantly increase losses. Resistors R7, R8, and R9 provide surge impedance and do not significantly increase losses.

The circuit on the output side of the opto-coupler 1410 can include a single transistor and an RC network. If pluses are present, the capacitor C5 is discharged before it can reach the $V_{be}$ level of the transistor and the transistor remains "off." If no pluses are present, the resistor R5 provides base drive for the transistor and it will be "on." The output of the opto-isolator (AC Detect) can be provided to the microcontroller, which determines if the emergency LED lighting system is coupled to an active AC power source based on the presence of pulses on the AC Detect line.

In additional or alternative examples, the AC detection circuit 1400 can provide a degree of line voltage measurement since the number of pluses present in a given time period increases with voltage. The number of pluses can be counted by the microcontroller in order to determine an approximate line voltage level.

Although an opto-coupler 1410 is shown in FIG. 14, the AC detection circuit 1400 can be used with transformer coupling as well. Using a pulse transformer in place of the opto-coupler 1410 can eliminate concerns for sensitivity variation and possible degradation. In some aspects, the AC detection circuit 1400 depicted in FIG. 14 can be used in other electronics, including other non-emergency LED lighting systems and other devices powered by an AC power source.

Communicating with a User or a Remote Device

In some aspects, an emergency LED lighting system can include a test switch pilot light ("TSPL"), which can provide an indication of the status of the emergency LED lighting system. In some examples, the TSPL can include a red LED and a green LED to indicate battery charge state. In additional or alternative examples, the TSPL can include non-visible light sources such as infrared LEDs. The TSPL can also blink (e.g., flash or turn on and off) at a predetermined rate or pattern to communicate error codes. Blinking an error code for communication with a human observer can require a slow blink rate (e.g., approximately 1 to 2 blinks per second) such that the human observer can detect that the LED is blinking or decipher a pattern.

In some aspects, the TSPL can blink at several thousand blinks per second. Although this blinking rate is too fast for a human observer to decipher, the blinking can be detected and deciphered by an appropriately designed electronic receiving device placed in proximity to the TSPL. For example, a smart phone that includes a suitable sensor (e.g., an on-board camera or light sensor) could detect a TSPL blinking at rates undetectable by humans. A software application installed on the smart phone can decipher the blinking pattern such that the emergency LED lighting system can communicate with the smart phone using the TSPL. The emergency LED lighting system can communicate a variety of data including battery status information, including battery charge state, and system status information, including error codes.

In additional or alternative aspects, a light sensor (e.g., a photodiode or phototransistor circuit) can be included in the emergency LED lighting system and coupled to a processing device to allow bi-directional communication via light pulses between the emergency LED lighting system and a remote device. In some examples, the emergency LED lighting system can receive a request for data by the light sensor detecting a blinking light produced by a remote device. In additional or alternative examples, the emergency LED lighting system can receive configuration data (e.g., operating voltages, power levels, timing information, parameter values, etc.), or firmware updates based on light pulses from a smart phone, tablet, or other appropriately designed device.

Figure 15:
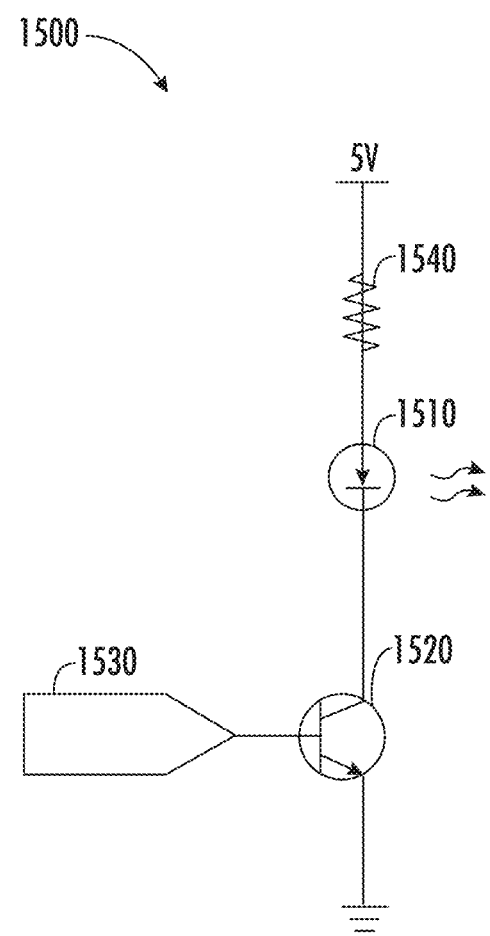
FIG. 15 is a flow chart of an example of a process for detecting that an emergency LED lighting system is conductively coupled to a grid using a detection circuit powered by the grid according to one aspect of the present disclosure.

FIG. 15 depicts an example of an LED communication circuit 1500 included in the emergency LED lighting system 100 that can blink an LED 1510 (e.g., a TSPL) for communicating with a remote device. The circuit includes a transistor 1520, a series resistor 1540, the LED 1510, and is controlled by an output 1530 from the microcontroller. The microcontroller can control the base of the transistor 1520 to turn the transistor on and off. In one example, the transistor 1520 is turned on when the microcontroller outputs a logic "high" state and the transistor 1520 is turned off when the microcontroller outputs a logic "low" state. The LED 1510 turns on in response to the microcontroller's output pin 1530 being set to a logic "high" state and the LED 1510 turns off in response to the microcontroller's output pin 1530 being set to a logic "low" state. The frequency and/or duration for each pulse of the LED 1510 may represent data transmitted by the system. A receiving device such as a smart phone, tablet, or other appropriately designed light sensing device can receive and decipher the data transmitted from the emergency LED lighting system 100.

Figure 16:
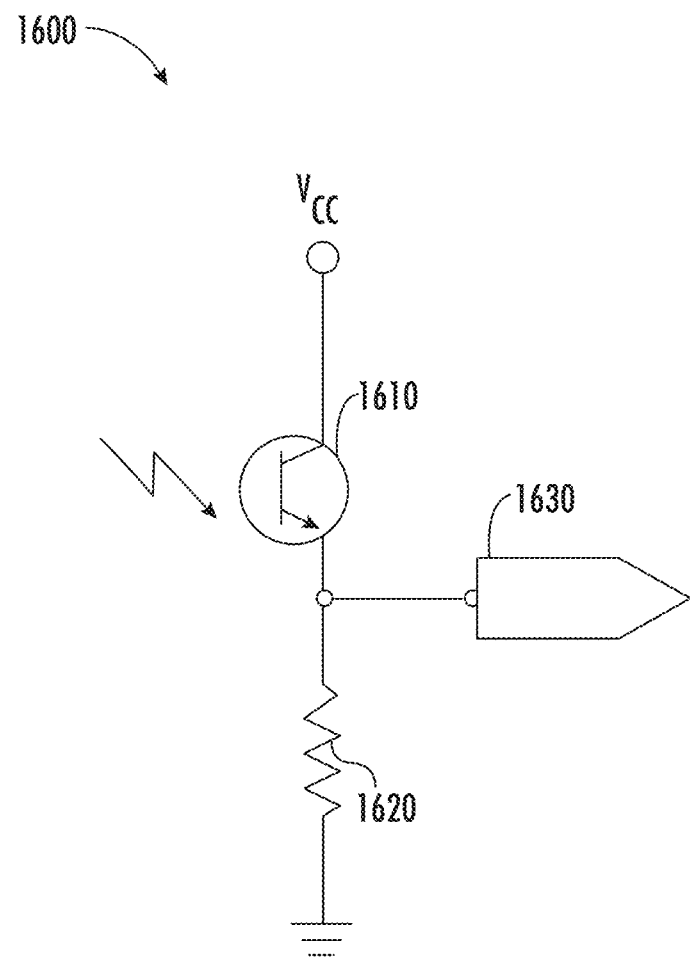
FIG. 16 is a schematic diagram of an example of a circuit for transmitting signals by an emergency LED lighting system to a remote device using a status light according to one aspect of the present disclosure.

FIG. 16 depicts an example of an LED communication circuit 1600 with a photodetector 1610 included in the emergency LED lighting system 100 for receiving light signals from a remote device. The photodetector 1610 can be coupled in series with a resistor 1620 to form a voltage divider. The output of the voltage divider can be conductively coupled to an input pin 1630 of the microcontroller 246. The photodetector 1610 can detect light signals from a light source coupled to a smart phone, tablet, or other appropriately designed light pulse emitting device with a light communication application. The resistance of the photodetector 1610 can change in response to the light, which can change the output of the voltage divider. The microcontroller 246 can receive the changes in the output of the voltage divider via the input pin 1630 and determine data from the light signals. In some examples, the photodetector 1610 can be included on a circuit board with the microcontroller. In additional or alternative examples, the photodetector 1610 can be integrated into a TSPL assembly.

Figure 17:
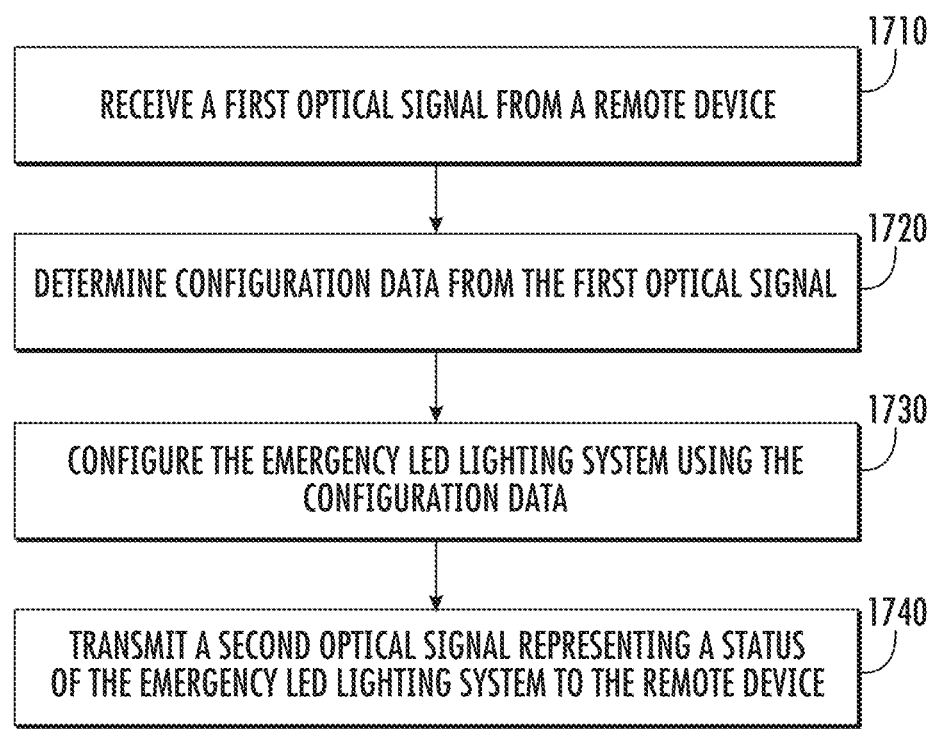
FIG. 17 is a schematic diagram of an example of a circuit for an emergency LED lighting system to receive signals from a remote device using a photodetector according to one aspect of the present disclosure.

FIG. 17 is a flow chart of an example of a process for the emergency LED lighting system 100 performing light communication. Although the process is described in regards to the emergency LED lighting system 100, circuit 1600 and circuit 1700, other implementations are possible. Including an LED communication circuit in an emergency LED lighting system 100 can allow for firmware updates and tests to be performed remotely.

In block 1710, a first optical signal is received by the circuit 1700 from a remote device. The remote device can include a mobile phone, table, or another light pulse emitting device. When the photodetector detects the first optical signal, the resistance of the photodetector can change, which changes the voltage provided to the microcontroller.

In block 1720, the microcontroller 246 determines configuration data from the first optical signal. The microcontroller 246 can detect a change in a voltage on the input pin 1730 conductively coupled to the communication circuit 1700. The microcontroller 246 can demodulate the changes in the voltage to determine the configuration data. In some aspects, the configuration data can indicate a change in mode. For example, the configuration data can instruct the microcontroller 246 to enter a test mode. In additional or alternative aspects, the configuration data can indicate a change in a soft start or rollback procedure or the values used in such procedures. For example, the configuration data can indicate a set of different rollback percentages to perform based on the ambient temperature. In block 1730, the microcontroller 246 uses the configuration data to configure the emergency LED lighting system 100. In some aspects, the microcontroller stores the configuration data to a memory device or transmits instructions to the emergency LED driver 120.

In block 1740, the circuit 1600 transmits a second optical signal representing a status of the emergency LED lighting system 100 to the remote device. The microcontroller 246 can vary a voltage provided to output pin 1630 to cause LED 1610 to flash and form the second optical signal. In some aspects, the microcontroller can generate the second optical signal to include characteristics of the battery pack 130 or current configuration settings. In some implementations, the communications transmitted to the remote device may use the LED lighting source instead of the TSPL.

The emergency LED lighting system may use other types of communication to communicate with a user or a remote device. For example, FIG. 2 illustrates that the microcontroller communicates via a transceiver 280, such as a LED-CODE transceiver.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

The invention claimed is:

1. A method for extending battery life, comprising:
entering a battery powered mode, wherein a battery powers a system that includes a driver and a load while in the battery powered mode;
controlling the driver to maintain load power at a predetermined power level;
receiving ambient temperature information for the battery;
comparing the temperature information to a rollback temperature range;
when the temperature information indicates a temperature within the rollback temperature range, initiating a power rollback while the system is in the battery powered mode, by:
decreasing load power from the predetermined power level to a first rollback power level between a first rollback time and a second rollback time, wherein the first rollback power level is less than the predetermined power level;
maintaining load power output by the driver at the first rollback power level from the second rollback time until a predetermined time;
between the predetermined time and a third rollback time decreasing the load power from the first rollback power level to a second rollback power level; and
maintaining the load power at the second rollback power level until exiting the battery powered mode.

2. The method of claim 1, further comprising: entering the battery powered mode in response to detecting a loss of AC power.

3. The method of claim 1, wherein a difference between the predetermined power level and the first rollback power level and a difference between the first rollback power level and the second rollback power level are approximately equal.

4. The method of claim 1, wherein controlling the driver to maintain load power at a predetermined power level comprises controlling the driver so that the driver gradually increases power to the load from approximately zero to the predetermined power level over a predetermined time interval.

5. The method of claim 1, further comprising: using the temperature information to determine the first rollback power level.

6. The method of claim 1, further comprising:
prior to the predetermined time, receiving additional temperature information; and comparing the additional temperature information to the rollback temperature range.

7. The method of claim 1, further comprising: receiving a value for at least one of: the rollback temperature range, the predetermined time, or the first rollback power level from a remote device via a wireless interface.

8. A method for extending battery life, comprising:
entering a battery powered mode, wherein a battery powers a system that includes a driver and a load while in the battery powered mode;
controlling the driver to maintain load power at a predetermined power level;
receiving information related to a battery operating characteristic;
comparing the battery operating characteristic information to a rollback range;
when the battery operating characteristic information indicates a value within the rollback range, initiating a power rollback while system is in the battery powered mode, by:
decreasing load power from the predetermined power level to a first rollback power level between a first rollback time and a second rollback time, wherein the first rollback power level is less than the predetermined power level;
maintaining load power output by the driver at or below the first rollback power level from the second rollback time until exiting the battery powered mode;
evaluating additional battery operating characteristic information between the second rollback time and exiting the battery powered mode to determine whether to decrease the load power from the first rollback power level to a second rollback power level; and
when the additional battery operating characteristic information indicates a value within a second rollback range, decreasing the load power to the second rollback power level, wherein the second rollback power level is less than the first rollback power level.

9. The method of claim 8, further comprising: entering the battery powered mode in response to detecting a loss of AC power.

10. The method of claim 8, wherein the battery operating characteristic information corresponds to at least one of a battery temperature, a battery age, and a number of hours of battery operation.

11. The method of claim 8, further comprising: when the additional battery operating characteristic information indicates a subsequent value within a third rollback range, decreasing the load power to a third rollback power level.

12. The method of claim 8, wherein controlling the driver to maintain load power at a predetermined power level comprises controlling the driver so that the driver gradually increases power to the load from approximately zero to the predetermined power level over a predetermined time interval.

13. A system, comprising:
a battery;
a driver capable of powering a load using the battery while in a battery powered mode; and
a controller having an input for receiving temperature information for the battery and an output for controlling the driver, wherein while in the battery powered mode, the controller is configured to:
control the driver so that the driver powers the load to a predetermined power level;
compare the temperature information to a rollback temperature range;
when the temperature information indicates a temperature within the rollback temperature range, initiating a power rollback while the system is in the battery powered mode by:
at a first rollback time, controlling the driver to reduce load power from the predetermined power level to a first rollback power level, wherein the first rollback power level is less than the predetermined power level;
maintaining the load power at the first rollback power level until a second rollback time; and at the second rollback time, controlling the driver to reduce load power from the first rollback power level to a second rollback power level, wherein the second rollback power level is less than the predetermined power level.

14. The system of claim 13, further comprising: maintaining the load power at the second rollback power level until the battery no longer powers the load.

15. The system of claim 13, further comprising: an input for receiving AC power from an AC power source; a battery charger for receiving AC power from the input and charging the battery; and an AC detect circuit for detecting a presence of AC power at the input, wherein the controller further comprises an input for receiving an AC detect signal and is further operable to enter a battery powered mode when the AC detect signal indicates a loss of the AC power.

16. The system of claim 13, further comprising a battery pack, wherein the battery pack includes the battery and a temperature sensor for providing the temperature information.

17. The system of claim 13, wherein the controller controls the driver so that the driver powers the load to a predetermined power level by controlling the driver so that the driver gradually increases power to the load from approximately zero to the predetermined power level over a predetermined time interval.

* * * * *